(12) United States Patent
Huang et al.

(10) Patent No.: US 9,106,144 B2
(45) Date of Patent: Aug. 11, 2015

(54) VOLTAGE CONVERTING APPARATUS AND SUB-HARMONIC DETECTOR THEREOF

(71) Applicant: Excelliance MOS Corporation, Hsinchu County (TW)

(72) Inventors: Fu-Chun Huang, Hsinchu County (TW); Hung-Che Chou, Hsinchu County (TW); Pao-Chuan Lin, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 206 days.

(21) Appl. No.: 13/794,817

(22) Filed: Mar. 12, 2013

(65) Prior Publication Data
US 2014/0063856 A1    Mar. 6, 2014

(30) Foreign Application Priority Data
Sep. 6, 2012    (TW) .............................. 101217204 A

(51) Int. Cl.
*G05F 1/656* (2006.01)
*H02M 3/335* (2006.01)
*H02M 1/12* (2006.01)

(52) U.S. Cl.
CPC ............ *H02M 3/33515* (2013.01); *H02M 1/12* (2013.01)

(58) Field of Classification Search
CPC ...... H02M 3/156; H02M 1/36; H02M 3/1588
USPC ......... 323/222, 237, 240, 271–275, 282–288; 363/21.1, 21.6, 21.18, 41, 95
See application file for complete search history.

(56) References Cited

U.S. PATENT DOCUMENTS

| | | | | |
|---|---|---|---|---|
| 6,417,707 B1 * | 7/2002 | Underhill et al. | ............. | 327/165 |
| 6,674,656 B1 | 1/2004 | Yang et al. | | |
| 7,368,897 B2 * | 5/2008 | Qahouq et al. | ................ | 323/282 |
| 8,030,908 B2 * | 10/2011 | Huang | ........................... | 323/237 |
| 8,045,351 B2 * | 10/2011 | Hsueh et al. | .................... | 363/95 |
| 8,558,483 B2 * | 10/2013 | Lee et al. | ....................... | 315/307 |
| 8,614,595 B2 * | 12/2013 | Acatrinei | ...................... | 327/172 |

* cited by examiner

*Primary Examiner* — Rajnikant Patel
(74) *Attorney, Agent, or Firm* — Jianq Chyun IP Office

(57) ABSTRACT

A voltage converting apparatus and a sub-harmonic detector are disclosed. The sub-harmonic detector includes a pulse eliminating circuit, a counter, and a comparator. The pulse eliminating circuit receives a pulse width modulation (PWM) signal and a reference PWM signal having a same period. The PWM signal and reference PWM signal has a plurality of pulses and reference pulses respectively. The pulse eliminating circuit eliminates at least one part of the pulses which overlap with the reference pulses for generating a processed signal. The counter counts the processed signal and the PWM signal during a time period to obtain first and second counting values. The comparator compares the first and second counting values for detecting whether a sub-harmonic condition happens or not in the PWM signal.

13 Claims, 7 Drawing Sheets

VOLTAGE CONVERTING APPARATUS AND SUB-HARMONIC DETECTOR THEREOF

CROSS-REFERENCE TO RELATED APPLICATION

This application claims the priority benefit of Taiwan application serial no. 101217204, filed on Sep. 6, 2012. The entirety of the above-mentioned patent application is hereby incorporated by reference herein and made a part of this specification.

BACKGROUND

1. Technical Field

The disclosure relates to a voltage converting apparatus, and especially to a sub-harmonic detector of the voltage converting apparatus.

2. Related Art

Referring to FIG. 1, FIG. 1 illustrates a circuit diagram of a conventional voltage converting apparatus 100. The voltage converting apparatus 100 includes an oscillator 110, an OR gate 120, a SR latch SR1 and a pulse width modulation (PWM) signal generator constructed by comparators CMP1 and CMP2, and the voltage converting apparatus 100 further includes a power transistor PM, a transformer T1, a resistor RS and a rectifier 130. Therein, the oscillator 110, the OR gate 120, the SR latch SR1 and the PWM signal generator constructed by comparators CMP1 and CMP2 are used for generating a PWM signal PWM to control an on-or-off action of the power transistor PM.

The resistor RS is used for detecting a current flowing from a source terminal of the power transistor PM, and thereby generating a detected voltage VCS. In the conventional technical field, a comparison of the detected voltage voltage VCS and a reference voltage VCL is performed through the comparator CMP2, and a result of comparison generated by the comparator CMP2 is provided to the OR gate 120 as a basis for generating the PWM signal PWM by the SR latch. More specifically, the comparator CMP2 may be used for preventing from the condition that an excessive current flows from the source terminal of the power transistor PM.

Referring to both FIGS. 2A and 2B for the following, FIGS. 2A and 2B illustrate waveform diagrams of the conventional voltage converting apparatus 100 in different states. Therein, in FIG. 2A, the power transistor PM in the voltage converting apparatus 100 generates a driving current to make the detected voltage VCS equal to the reference voltage VCL, wherein the detected voltage VCS obtained at different timings TP1-TP3 are detected voltages VCS11, VSC12 and VCS13. Thus, it can be seen that voltage values of the detected voltage VCS of different periods are approximate, and thereby make the PWM signal generator of the voltage converting apparatus 100 generate the PWM signal PWM having a stable pulse width. In comparison, in FIG. 2B, the power transistor PM in the voltage converting apparatus 100 generates a driving current to make the detected voltage VCS equal to the reference voltage VCL, wherein the detected voltage VCS obtained at different timings TP1-TP3 are detected voltages VCS21, VSC22 and VCS23. Thus, it can be seen that the difference between the values of the detected voltage VCS of different periods is larger, and the pulse width of the PWM signal PWM generated by the PWM signal generator of the voltage converting apparatus 100 fluctuates, generating a so-called sub-harmonic condition (also known as a fluctuating condition).

SUMMARY

A sub-harmonic detector of a pulse width modulation (PWM) signal is provided herein for effectively detecting a sub-harmonic condition in the PWM signal.

A voltage converting apparatus is provided herein for detecting a sub-harmonic condition in a PWM signal thereof.

The sub-harmonic detector of a PWM signal is introduced herein, suitable for a voltage converting apparatus, including a pulse eliminating circuit, a counter and a comparator. The pulse eliminating circuit receives and a reference PWM signal having a same period with the PWM signal and receives the PWM signal from the voltage converting apparatus. The PWM signal has a plurality of pulses, and the reference PWM signal has a plurality of reference pulses. The pulse eliminating circuit subtracts each of the corresponding reference pulses from each of the pulses and generates a processed signal. The counter receives and counts the processed signal and the PWM signal during a time period to obtain first and second counting values. The comparator is coupled to the counter and compares the first and second counting values for detecting whether a sub-harmonic condition happens or not in the PWM signal.

In an embodiment herein, a rising edge of each of the reference pulses is synchronous with or prior to a rising edge of each of the corresponding pulses.

In an embodiment herein, the pulse eliminating circuit is a logical operation circuit.

In an embodiment herein, the pulse eliminating circuit includes an inverter and a NOR gate. An input terminal of the inverter receives the PWM signal. A first input terminal of the NOR gate receives the reference PWM signal, and a second input terminal thereof is coupled to an output terminal of the inverter, wherein an output terminal of the NOR gate generates the processed signal.

In an embodiment herein, the pulse eliminating circuit includes an AND gate and an inverter. An input terminal of the inverter receives the reference PWM signal, a first input terminal of the AND gate receives the PWM signal, and a second input terminal thereof is coupled to an output terminal of the inverter, wherein an output terminal of the AND gate generates the processed signal.

The voltage converting apparatus is introduced herein, including a power transistor, a transforming and rectifying circuit, a current detector, a PWM signal generator and a sub-harmonic detector. A control terminal of the power transistor receives a PWM signal, and the transforming and rectifying circuit is coupled to a first terminal of the power transistor and an operating voltage for transforming and rectifying the voltage on the first terminal of the power transistor in order to generate an output voltage. The current detector is coupled to a second terminal of the power transistor for generating a detected voltage according to a detected current flowing from the second terminal of the power transistor. The PWM signal generator is coupled to the power transistor and the current detector for generating a PWM signal according to the detected voltage, and the PWM signal generator further generates a reference PWM signal, wherein periods of the reference PWM signal and the PWM signal are the same. The sub-harmonic detector is coupled to the PWM signal generator for receiving the reference PWM signal and the PWM signal. The sub-harmonic detector includes a pulse eliminating circuit, a counter and a comparator. The pulse eliminating circuit receives the reference PWM signal having a same period with the PWM signal, and receives the PWM signal from the voltage converting apparatus. The PWM signal has a plurality of pulses, and the reference PWM signal has a plurality of reference pulses, wherein the pulse eliminating circuit eliminates a part of the pulses overlapping with the reference pulses respectively and generates a processed signal. The counter counts the processed signal and the PWM signal during a time period to obtain first and second counting values respectively. The comparator is coupled to the counter and compares the first and second counting values for detecting whether a sub-harmonic condition happens or not in the PWM signal.

In an embodiment herein, the voltage converting apparatus further includes a reference voltage generator. The reference voltage generator is coupled to a first comparator for providing a reference voltage, wherein the reference voltage rises with time within a single period of a clock signal according to a rising slope.

In an embodiment of the disclosure, the sub-harmonic detector further transmits a sub-harmonic detection result to the reference voltage generator for adjusting the rising slope.

Based on the above, the disclosure eliminates the pulses of the PWM signal with the reference pulses of the reference PWM signal by means of the pulse eliminating circuit, and thereby generates the processed signal. The disclosure also calculates the number of pulses of the processed signal and the PWM signal in a same time period for detecting whether the sub-harmonic condition happens or not in the PWM signal. Thus, whether the sub-harmonic condition happens or not in the PWM signal is effectively detected. The designer may also make adequate adjustment to the PWM signal according to the detection result of the sub-harmonic condition.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
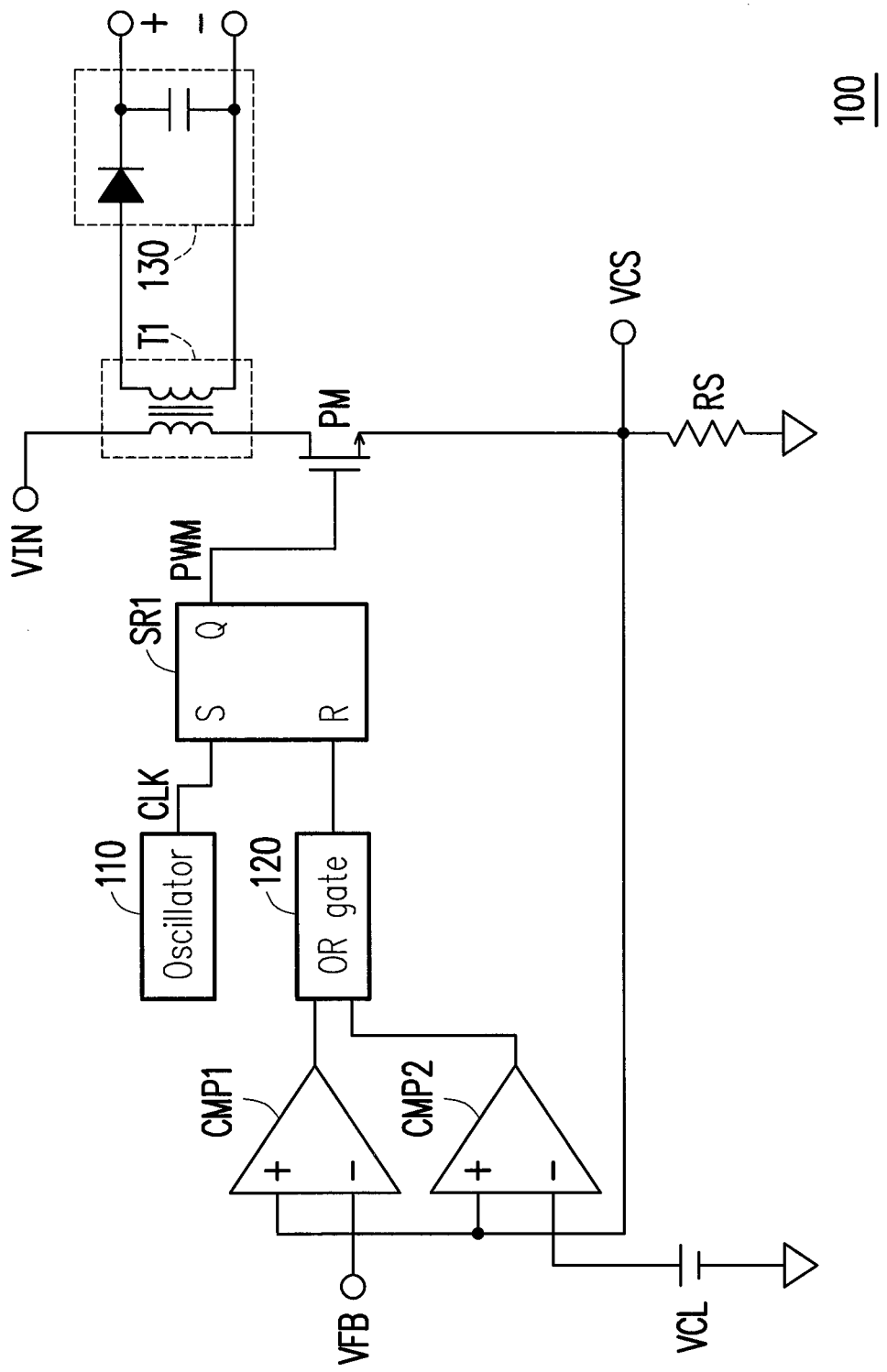
FIG. 1 illustrates a circuit diagram of a conventional voltage converting apparatus 100.
Figure 2A:
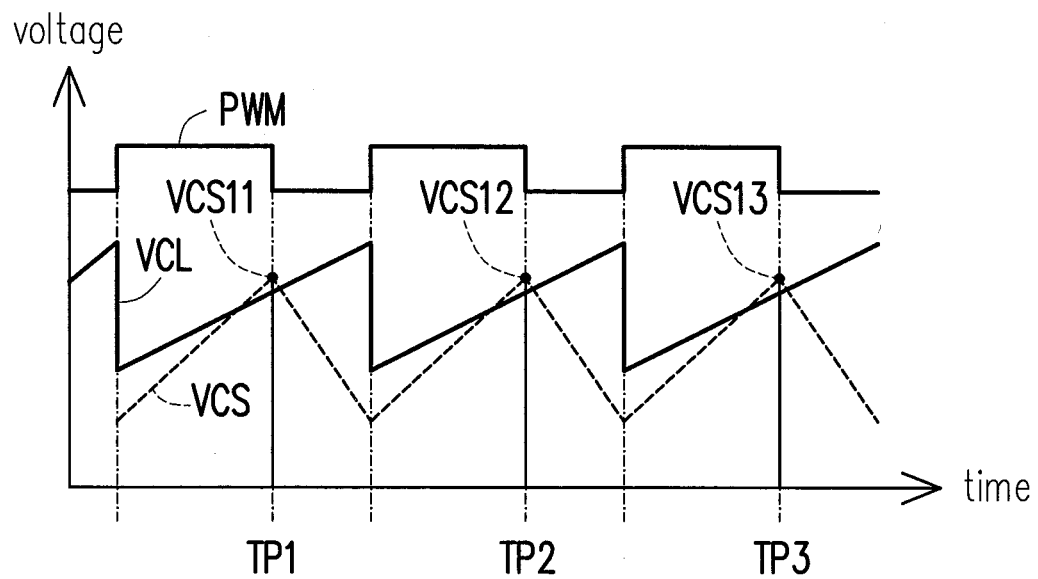
FIGS. 2A and 2B illustrate waveform diagrams of the conventional voltage converting apparatus 100 in different states.
Figure 2B:
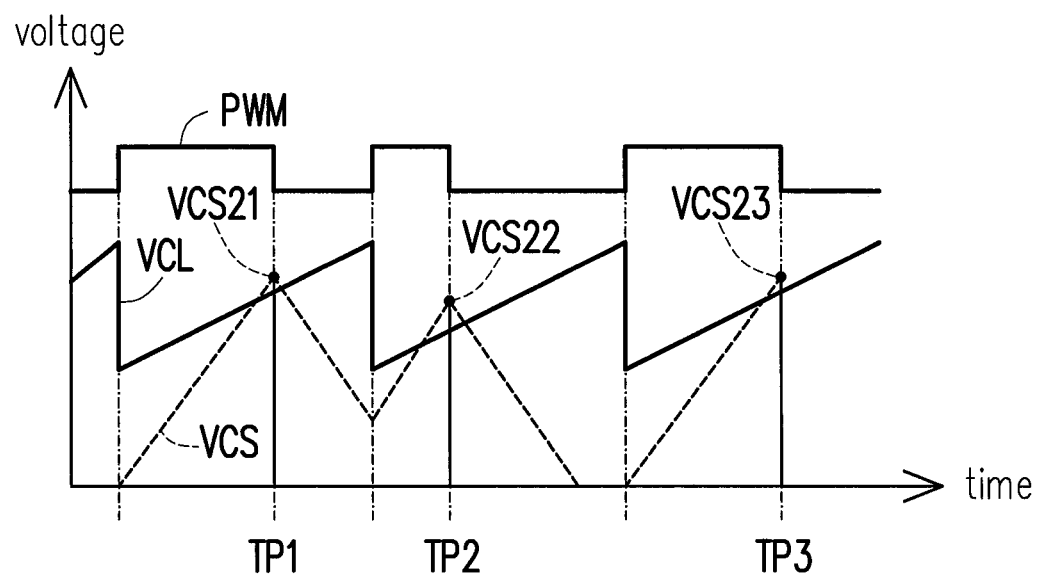
Figure 3:
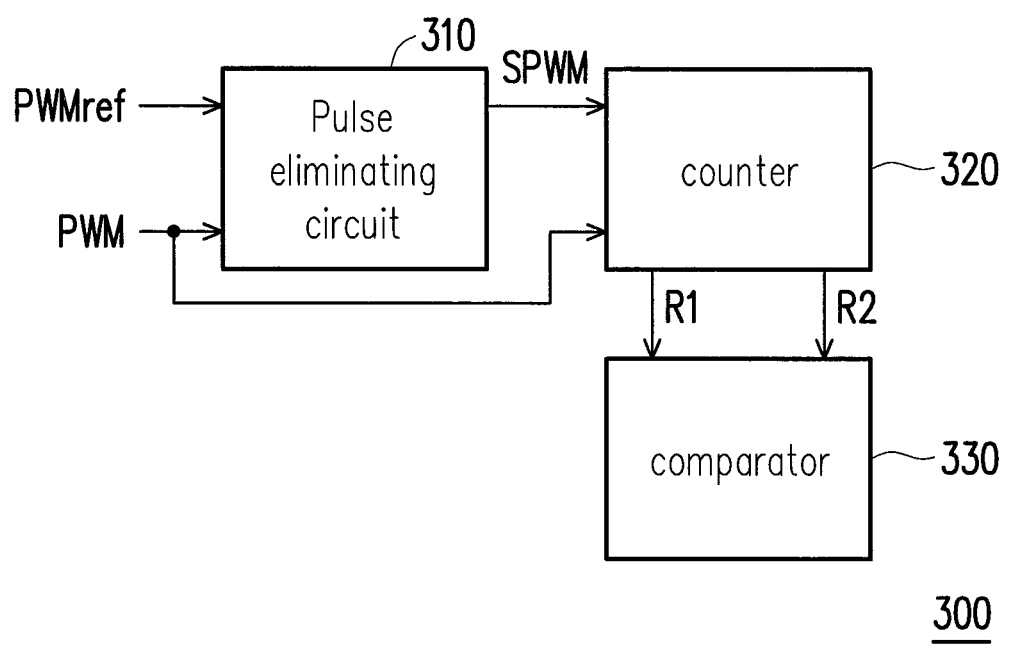
FIG. 3 illustrates a schematic diagram of a sub-harmonic detector 300 according to an embodiment of the disclosure.

Referring to FIG. 3, FIG. 3 illustrates a schematic diagram of a sub-harmonic detector 300 according to an embodiment of the disclosure. The sub-harmonic detector 300 is suitable for a voltage converting apparatus for detecting whether a sub-harmonic condition happens or not in a pulse width modulation (PWM) signal generated in the voltage converting apparatus. The sub-harmonic detector 300 includes a pulse eliminating circuit 310, a counter 320 and a comparator 330. The pulse eliminating circuit 310 receives a PWM signal PWM and receives a reference PWM signal PWMref, wherein the reference PWM signal PWMref and the PWM signal PWM have a same period. Besides, the PWM signal PWM has a plurality of pulses, and the reference PWM signal PWMref has a plurality of reference pulses. The pulse eliminating circuit 310 eliminates a part of the pulses of the PWM signal PWM overlapping with the reference pulses of the reference PWM signal PWMref, and thereby generates a processed signal SPWM.

The counter 320 is coupled to the pulse eliminating circuit 310 for receiving and counting the processed signal SPWM and the PWM signal PWM within a same time period to obtain two counting values R1 and R2 respectively. The comparator 330 is coupled to the counter 320. The comparator 330 compares the counting values R1 and R2 to detect whether the sub-harmonic condition happens or not in the PWM signal PWM.

Figure 4A:
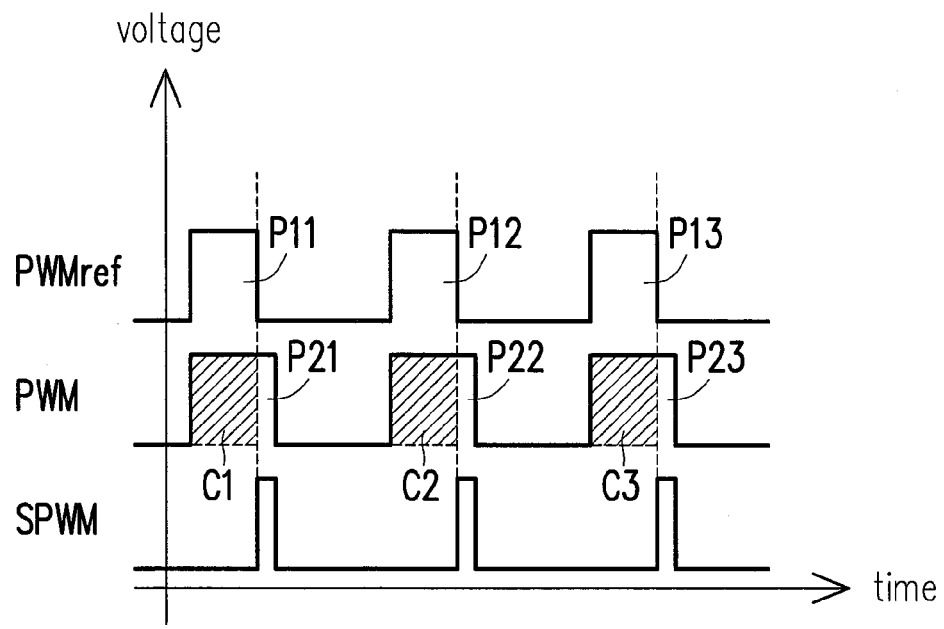
FIGS. 4A and 4B illustrate active waveforms of a pulse eliminating circuit 310.
Figure 4B:
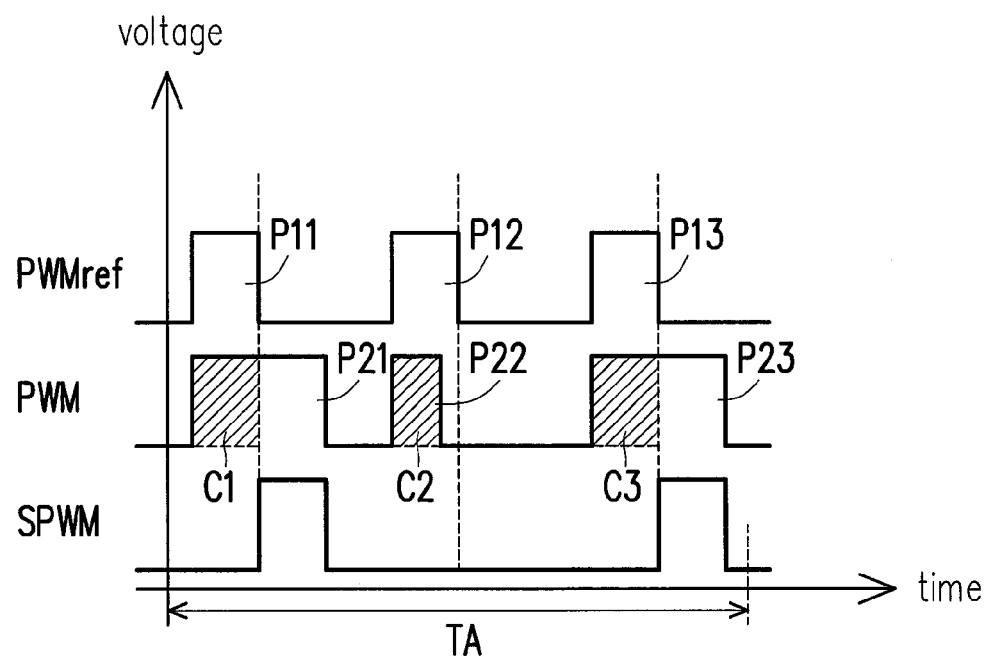

More specifically, referring to FIGS. 4A and 4B, FIGS. 4A and 4B illustrate active waveforms of the pulse eliminating circuit 310. Therein, in FIG. 4A, the PWM signal PWM has pulses P21-P23, while the reference PWM signal PWMref has pulses P11-P13. It is obvious from FIG. 4A that the pulse eliminating circuit 310 subtracts parts of pulse widths C1-C3 of the pulses P21-23 when subtracting the reference pulses P11-13 from the pulses P21-23 and generates the processed signal SPWM.

It is worth noting that the reference PWM signal PWMref is a signal with a fixed period and a fixed duty cycle. Besides, rising edges of the reference pulses P11-P13 of the reference PWM signal PWMref are synchronous with rising edges of the pulses P21-P23 of the PWM signal PWM. In addition, in FIG. 4A, the sub-harmonic condition does not happen in the PWM signal PWM, and therefore widths of the pulses P21-P23 of the PWM signal PWM are stably larger than widths of the reference pulses P11-P13.

Referring further to FIG. 4B, in FIG. 4B, the widths of the pulses P21-P23 fluctuate because the sub-harmonic condition happens in the PWM signal PWM. Therein, the width of the pulse P21 large enough to restrict the width of the pulse P22, which becomes very small. In such a state, after subtracting the pulse P22 and the reference pulse P12, the pulse eliminating circuit 310 completely eliminates the pulse P22.

Accordingly, in FIG. 4B, the number of pulses on the processed signal SPWM is significantly fewer than the number of pulses on the PWM signal PWM within a time interval TA. Therefore, whether the sub-harmonic condition happens or not in the PWM signal PWM is effectively detected through calculating the difference between the numbers of the pulses of the processed signal SPWM and the PWM signal PWM within a same time interval.

Figure 5A:
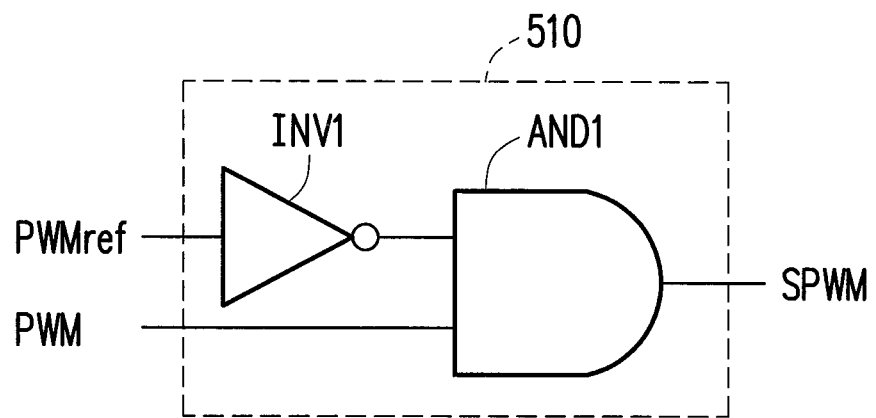
FIGS. 5A and 5B illustrate respectively different implementations of the pulse eliminating circuit 310 according to an embodiment of the disclosure.
Figure 5B:
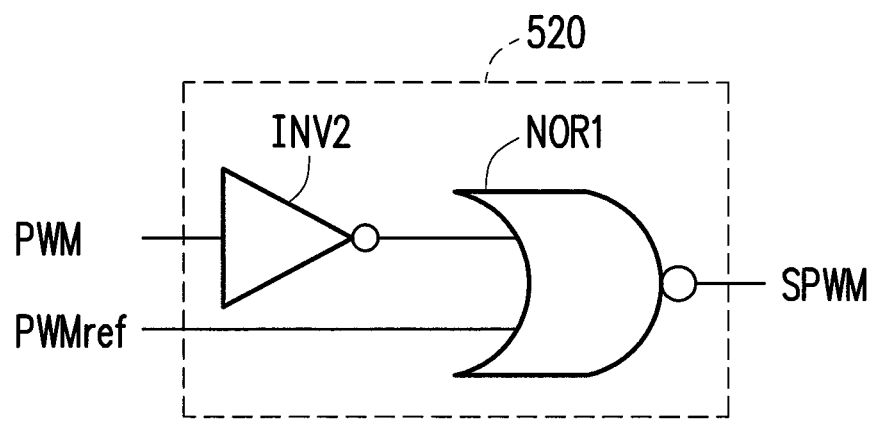

Referring to FIGS. 5A and 5B for the following, FIGS. 5A and 5B illustrate different implementations of the pulse eliminating circuit 310 respectively according to an embodiment of the disclosure. In FIG. 5A, the pulse eliminating circuit 310 includes a logical operation circuit 510. The logical operation circuit 510 includes an inverter INV1 and an AND gate AND1, wherein an input terminal of the inverter INV1 receives the reference PWM signal PWMref, and an output terminal of the inverter INV1 is coupled to an input terminal of the AND gate AND1. Another input terminal of the AND gate AND1 receives the PWM signal PWM, while an output terminal of the AND gate AND1 generates the processed signal SPWM.

In FIG. 5B, the pulse eliminating circuit 310 includes a logical operation circuit 520. The logical operation circuit 520 includes an inverter INV2 and a NOR gate NOR1, wherein an input terminal of the inverter INV2 receives the PWM signal PWM, and an output terminal of the inverter INV2 is coupled to an input terminal of the NOR gate NOR1. Another input terminal of the NOR gate NOR1 receives the reference PWM signal PWMref, while an output terminal of the NOR gate NOR1 generates the processed signal SPWM.

It is worth noting from the implementations in FIGS. 5A and 5B that the pulse eliminating circuit 310 may be implemented through logical operation circuits constructed by different logic gates. The implementations in FIGS. 5A and 5B are merely two examples, and are not used for confining the disclosure.

Figure 6:
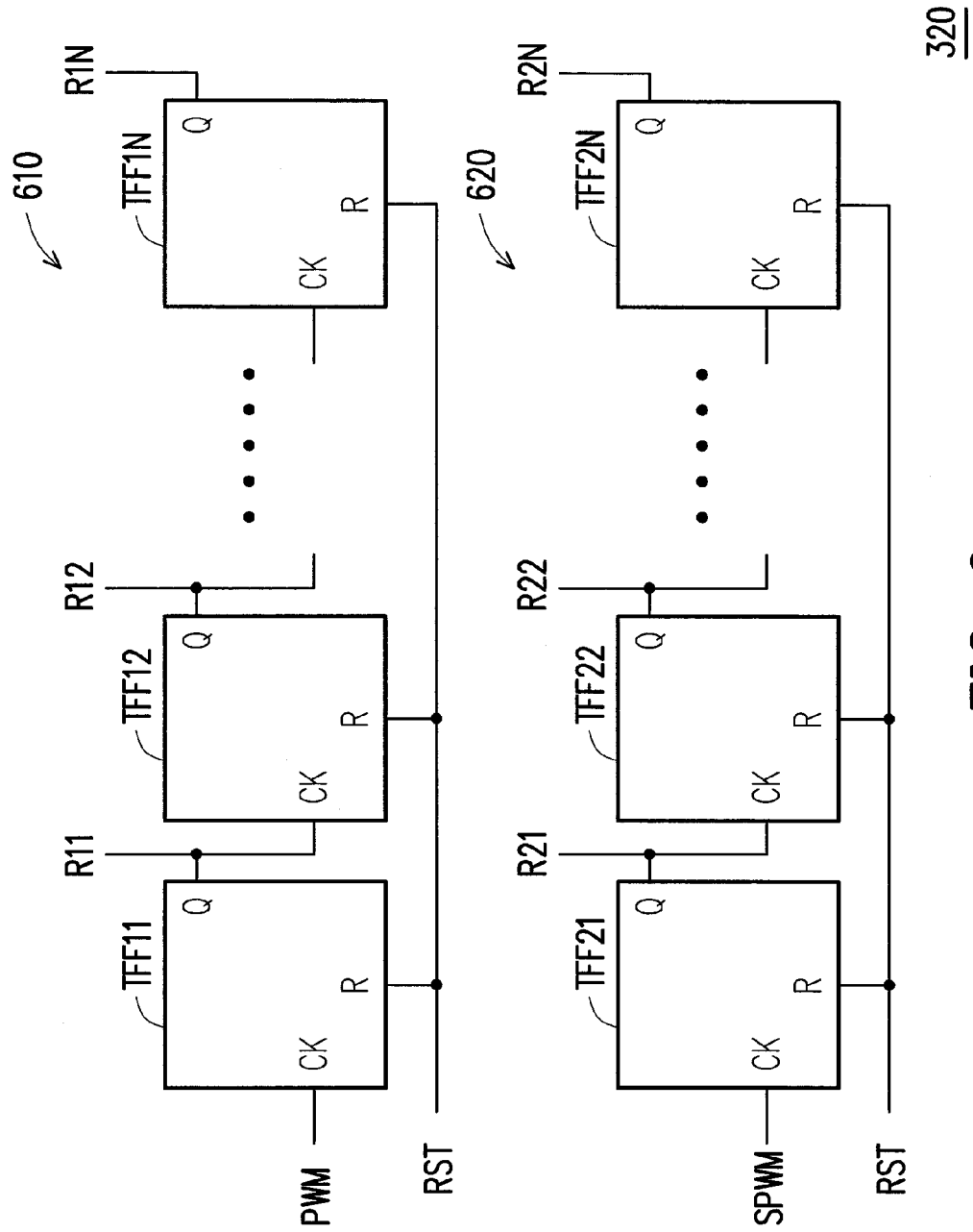
FIG. 6 illustrates an implementation of a counter 320 according to an embodiment of the disclosure.

Referring to FIG. 6 for the following, FIG. 6 illustrates an implementation of the counter 320 according to an embodiment of the disclosure. The counter 320 includes counting circuits 610 and 620. The counting circuits 610 and 620 receive the PWM signal PWM and the processed signal SPWM respectively, and focus on the pulse numbers of the PWM signal PWM and the processed signal SPWM within a specific time period. Therein, the counting circuit 610 includes a plurality of T-flip flops TFF11-TFF1N. A clock terminal CK of a first-level T-flip flop TFF11 receives the PWM signal PWM. Output terminals Q of each level of T-flip flops TFF11-TFF1N are coupled to clock terminals CK of lower-level T-flip flops TFF11-TFF1N, and the output terminals Q of each level of T-flip flops TFF11-TFF1N generate a plurality of bits R11-R1N of the counting value respectively.

The counting circuit 620 includes a plurality of T-flip flops TFF21-TFF2N. A clock terminal CK of a first-level T-flip flop TFF21 receives the processed signal SPWM. Output terminals Q of each level of T-flip flops TFF21-TFF2N are coupled to clock terminals CK of lower-level T-flip flops TFF21-TFF2N, and the output terminals Q of each level of T-flip flops TFF21-TFF2N generate a plurality of bits R21-R2N of another counting value respectively.

Moreover, reset terminals R of the T-flip flops TFF11-TFF1N and TFF21-TFF2N in FIG. 6 receive a reset signal RST together. The reset signal RST is used for resetting the T-flip flops TFF11-TFF1N and TFF21-TFF2N before the counting circuits 610 and 620 count. For instance, if the counting actions of the counting circuits 610 and 620 are performed according to the time period TA as in FIG. 4B, the reset signal RST is provided at a beginning of the time period TA for resetting the T-flip flops TFF11-TFF1N and TFF21-TFF2N.

Figure 7:
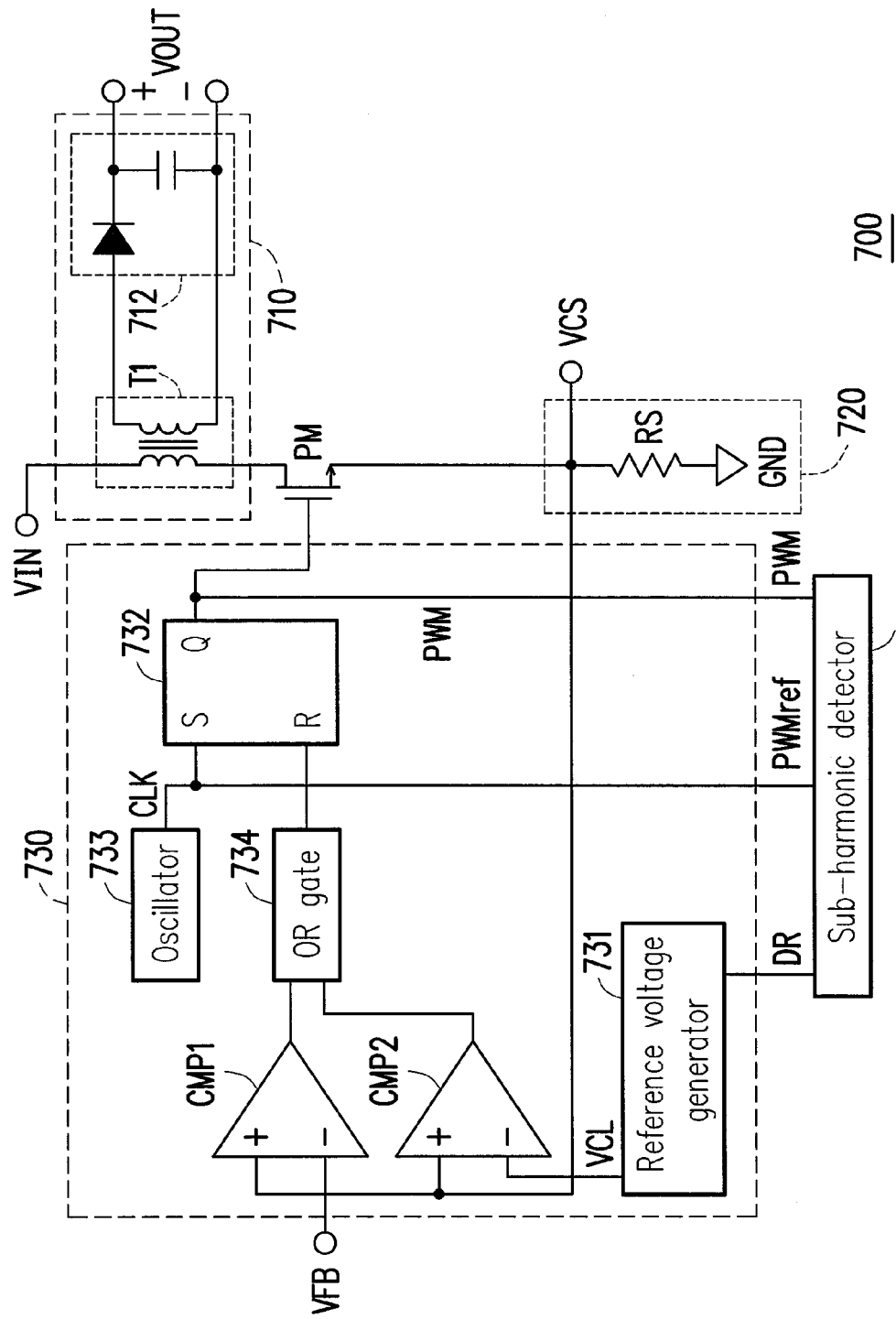
FIG. 7 illustrates a schematic diagram of a voltage converting apparatus 700 according to an embodiment of the disclosure.

Referring to FIG. 7, FIG. 7 illustrates a schematic diagram of a voltage converting apparatus 700 according to an embodiment of the disclosure. A voltage converting apparatus 700 include a power transistor PM, a transforming and rectifying circuit 710, a current detector 720, a PWM signal generator 730 and a sub-harmonic detector 740. A control terminal of the power transistor PM receives the PWM signal PWM, a drain of the power transistor PM receives an operating voltage YIN through a transformer T1, and a source of the power transistor is coupled to the current detector 720. The transforming and rectifying circuit 710 includes the transformer T1 and a rectifier 712, and the transforming and rectifying circuit 710 is coupled to a first end (the drain) of the power transistor PM and the operating voltage VIN. The transforming and rectifying circuit 710 is used for transforming and rectifying a voltage of the drain of the power transistor PM to generate an output voltage VOUT.

The current detector 720 includes a resistor RS, and the resistor RS is serially connected between a second terminal (the source) of the power transistor and a ground potential GND. The resistor RS is used for receiving a current from the source of the power resistor PM and generating a detected voltage VCS at a terminal where the resistor RS is coupled to the power transistor PM.

The PWM signal generator 730 is coupled to the power transistor PM and the current detector 720. The PWM signal generator 730 generates the PWM signal PWM according to the detected voltage VCS, and the PWM signal generator 730 further generates the reference PWM signal PWMref, wherein periods of the reference PWM signal PWMref and the PWM signal PWM are the same. Note that in the embodiment, the PWM signal generator 730 includes a reference voltage generator 731, an SR latch 732, an oscillator 733, an OR gate 734 and comparators CMP1 and CMP2. Therein, the comparator CMP2 receives and compares the detected voltage VCS and a reference voltage VCL, and the comparator CMP1 receives and compares the detected voltage VCS and a feedback voltage VFB. The OR gate 734 receives the result of comparison from the comparators CMP1 and CMP2 to perform an OR logical operation, and provides the result of operation to a reset terminal R of the SR latch 732. The oscillator 733 is coupled to a setting terminal S of the SR latch 732, and provides a clock signal CLK to the setting terminal S of the SR latch 732. In the embodiment, the oscillator 733 also provides the clock signal CLK to the sub-harmonic detector 740 as the reference PWM signal PWMref.

The detailed implementation and operation of the sub-harmonic detector 740 in the embodiment is the same as the sub-harmonic detector in the above embodiment and implementation, and therefore no elaboration is provided herein.

It is worth noting that the sub-harmonic detector 740 transmits a detected result DR of whether the sub-harmonic condition happens or not in the PWM signal PWM to the reference voltage generator 731. The reference voltage generator 731 further releases the sub-harmonic condition generated in the PWM signal PWM by changing the generated reference voltage VCL when the detected result DR points out that the sub-harmonic condition happens in the PWM signal PWM. For instance, if the reference voltage generator 731 generates the reference voltage VCL rising with time within a single period of the clock signal CLK according to a rising slope, the reference voltage generator 731 releases the sub-harmonic condition generated in the PWM signal PWM by adjusting the rising slope when the detected result DR points out that the sub-harmonic condition happens in the PWM signal PWM.

Moreover, the feedback signal VFB may usually be obtained by performing a voltage division on the output voltage. The feedback voltage VFB provides information on whether the output voltage VOUT generated by the voltage converting apparatus 700 has reached a predetermined target value.

In light of the above, the disclosure eliminates the overlapping part of the pulses and the reference pulses in the PWM signal and the reference PWM signal for generating the processed signal. It is detected whether the sub-harmonic condition happens or not in the PWM signal through calculating the number of pulses of the PWM signal and the processed signal within the same time period. That is to say that the disclosure utilizes a simple circuit to effectively detect the sub-harmonic condition happening in the PWM signal, and further performs a compensation for the sub-harmonic condition in the PWM signal for enhancing the work efficiency of the voltage converting apparatus.

Although the disclosure has been described with reference to the embodiments thereof, it will be apparent to one of the ordinary skills in the art that variations and modifications to the described embodiments may be made without departing from the spirit and scope of the disclosure. Accordingly, the scope of the disclosure will be defined by the attached claims, not by the above detailed description.

What is claimed is:

1. A sub-harmonic detector of a pulse width modulation (PWM) signal for a voltage converting apparatus, comprising:
    a pulse eliminating circuit for receiving a reference PWM signal having a same period with the PWM signal and receiving the PWM signal from the voltage converting apparatus, the PWM signal having a plurality of pulses, and the reference PWM signal having a plurality of reference pulses, wherein the pulse eliminating circuit subtracts each of the corresponding reference pulses from each of the pulses and generates a processed signal;
    a counter for receiving and counting the processed signal and the PWM signal respectively within a time period to obtain a first counting value and a second counting value; and
    a comparator being coupled to the counter and the comparator comparing the first counting value and the second counting value to detect whether a sub-harmonic condition happens or not in the PWM signal.

2. The sub-harmonic detector according to claim 1, wherein a rising edge of each of the reference pulses is synchronous with or prior to a rising edge of each of the corresponding pulses.

3. The sub-harmonic detector according to claim 1, wherein the pulse eliminating circuit is a logical operation circuit.

4. The sub-harmonic detector according to claim 3, wherein the logical operation circuit comprises:
    an inverter, an input terminal of the inverter receives the PWM signal; and
    a NOR gate, a first input terminal of the NOR gate receives the reference PWM signal, a second input terminal of the NOR gate is coupled to an output terminal of the inverter, and an output terminal of the NOR gate generates the processed signal.

5. The sub-harmonic detector according to claim 3, wherein the logical operation circuit comprises:
    an inverter, an input terminal of the inverter receives the reference PWM signal; and
    an AND gate, a first input terminal of the AND gate receives the PWM signal, a second input terminal of the AND gate is coupled to an output terminal of the inverter, and an output terminal of the AND gate generates the processed signal.

6. A power converting device, comprising:
    a power transistor, a control terminal of the power transistor receiving a PWM signal;
    a transforming and rectifying circuit, coupled to a first terminal of the power transistor and an operating voltage for transforming and rectifying a voltage on the first terminal of the power transistor to generate an output voltage;
    a current detector, coupled to a second terminal of the power transistor for generating a detected voltage according to a detected current flowing from the second terminal of the power transistor;
    a PWM signal generator, coupled to the power transistor and the current detector for generating the PWM signal according to the detected voltage, and the PWM signal generator further generating a reference PWM signal, wherein periods of the reference PWM signal and the PWM signal are the same; and
    a sub-harmonic detector, coupled to the PWM signal generator for receiving the reference PWM signal and the PWM signal, comprising:
        a pulse eliminating circuit for receiving the reference PWM signal and the PWM signal, the PWM signal having a plurality of pulses, while the reference PWM signal having a plurality of reference pulses, wherein the pulse eliminating circuit eliminates a part of the pulses overlapping with the reference pulses and generates a processed signal;
        a counter for receiving and counting the processed signal and the PWM signal respectively within a time period and obtain a first counting value and a second counting value respectively; and
        a comparator, coupled to the counter for comparing the first counting value and the second counting value to detect whether a sub-harmonic condition happens or not in the PWM signal to generate a sub-harmonic detection result.

7. The voltage converting apparatus according to claim 6, wherein rising edges of each of the pulses and each of the corresponding reference pulses are synchronous.

8. The voltage converting apparatus according to claim 6, wherein the pulse eliminating circuit is a logical operation circuit.

9. The voltage converting apparatus according to claim 8, wherein the pulse eliminating circuit comprises:
    an inverter, wherein an input terminal thereof receives the PWM signal; and
    a NOR gate, wherein a first input terminal thereof receives the reference PWM signal, a second input terminal thereof is coupled to an output terminal of the inverter, and an output terminal of the NOR gate generates the processed signal.

10. The voltage converting apparatus according to claim 8, wherein the pulse eliminating circuit comprises:
    an inverter, wherein an input terminal thereof receives the reference PWM signal; and
    an AND gate, wherein a first input terminal thereof receives the reference PWM signal, a second input terminal thereof is coupled to an output terminal of the inverter, and an output terminal of the AND gate generates the processed signal.

11. The voltage converting apparatus according to claim 6, wherein the PWM signal generator comprises:
    a first comparator for receiving the detected voltage and a reference voltage for comparison;
    a second comparator for receiving the detected voltage and a feedback voltage for comparison;
    an OR gate, wherein an input terminal is coupled to an output terminal of the first comparator, and the other input terminal is coupled to an output terminal of the second comparator;
    an oscillator for generating a clock signal to be provided as the reference PWM signal; and
    a SR latch, having a setting terminal, a reset terminal and an output terminal, wherein the setting terminal receives the clock signal, the reset terminal is coupled to an output terminal of the OR gate, and an output terminal of the SR latch generates the PWM signal.

12. The voltage converting apparatus according to claim 11, wherein the PWM signal generator further comprises:
   a reference voltage generator, coupled to the first comparator for providing the reference voltage, wherein the reference voltage rises with time within a single period of the clock signal according to a rising slope.

13. The voltage converting apparatus according to claim 12, wherein the sub-harmonic detector further transmits the sub-harmonic detection result to the reference voltage generator for adjusting the rising slope.

* * * * *